United States Patent [19]

Hintze et al.

[11] Patent Number: 5,758,994

[45] Date of Patent: Jun. 2, 1998

[54] CUTTING INSERT

[75] Inventors: Wolfgang Hintze; Bernd Knickenberg, both of Essen, Germany

[73] Assignee: Widia GmbH, Essen, Germany

[21] Appl. No.: 436,327

[22] PCT Filed: Nov. 18, 1993

[86] PCT No.: PCT/DE93/01108

§ 371 Date: May 11, 1995

§ 102(e) Date: May 11, 1995

[87] PCT Pub. No.: WO94/12302

PCT Pub. Date: Jun. 9, 1994

[30] Foreign Application Priority Data

Nov. 21, 1992 [DE] Germany .................. 42 39 236.5

[51] Int. Cl.6 ................................................ B23B 27/22
[52] U.S. Cl. ...................... 407/116; 407/113; 407/115
[58] Field of Search ................................ 407/113, 114, 407/115, 116, 117, 120

[56] References Cited

U.S. PATENT DOCUMENTS

| 4,215,957 | 8/1980 | Holma et al. ............... 407/114 |
| 4,632,608 | 12/1986 | Blomberg et al. ............ 407/114 |
| 4,969,779 | 11/1990 | Barten . | |
| 4,988,242 | 1/1991 | Pettersson et al. ........... 407/114 |
| 5,074,720 | 12/1991 | Logvist et al. ............ 407/116 X |

FOREIGN PATENT DOCUMENTS

| 0046511 | 2/1982 | European Pat. Off. ....... 407/114 |
| 0 054 913 A3 | 6/1982 | European Pat. Off. . |
| 0 066 091 A1 | 12/1982 | European Pat. Off. . |
| 0 143 758 A1 | 6/1985 | European Pat. Off. . |
| 0159747 | 10/1985 | European Pat. Off. ....... 407/115 |
| 0 278 083 | 8/1988 | European Pat. Off. . |
| 0 506 078 A3 | 9/1992 | European Pat. Off. . |

*Primary Examiner*—M. Rachuba
*Assistant Examiner*—Henry W. H. Tsai
*Attorney, Agent, or Firm*—Herbert Dubno; Andrew Wilford

[57] ABSTRACT

A cutting insert for material-removing machining is formed with at least one generally straight cutting edge and a central flat plateau spaced backward from and at a predetermined height above the cutting edge. A plurality of elongated ridge-like chip-forming elements each extend along a respective longitudinal axis forming a respective acute angle to a respective perpendicular to the cutting edge from a leading end spaced backward from the cutting edge to a trailing end at the plateau and are each formed of a row of discrete bumps defining a contour line having adjacent the rear end a rear portion of a maximum height at least equal to that of the plateau, forward therefrom a front portion of a minimum height, and a rising intermediate portion having a length equal to at least half a length of the respective element. The cutting insert further is formed with a land extending along the cutting edge between the front ends and the cutting edge and a groove extending parallel to the cutting edge between the land and the plateau, the chip-forming elements being mainly in the groove.

17 Claims, 15 Drawing Sheets

FIG. 3a
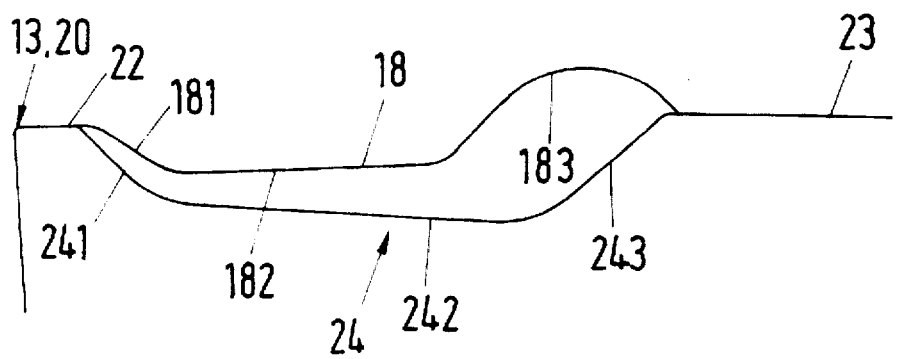
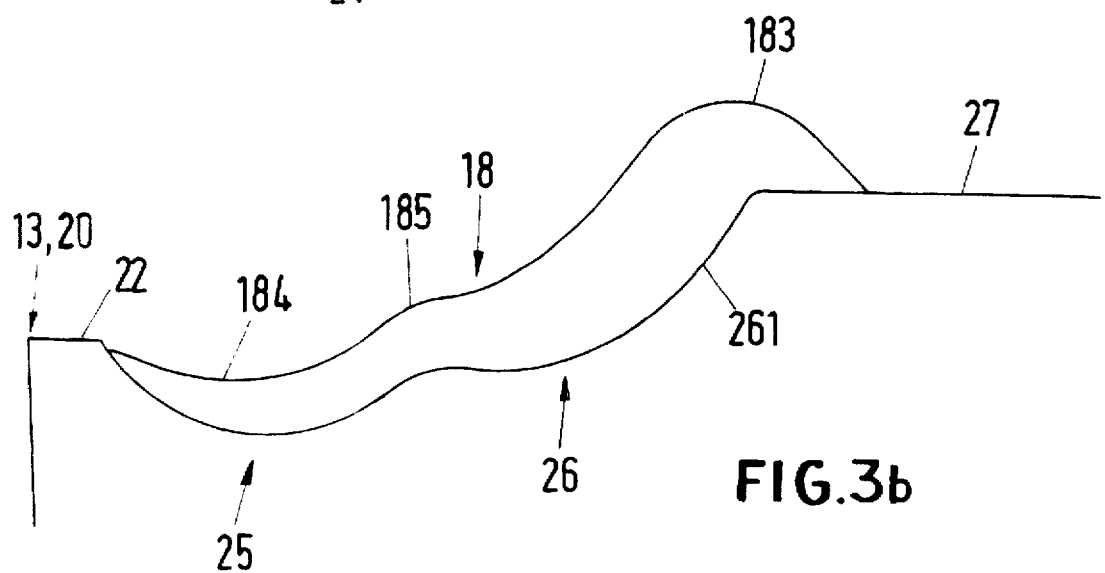
FIG. 3b
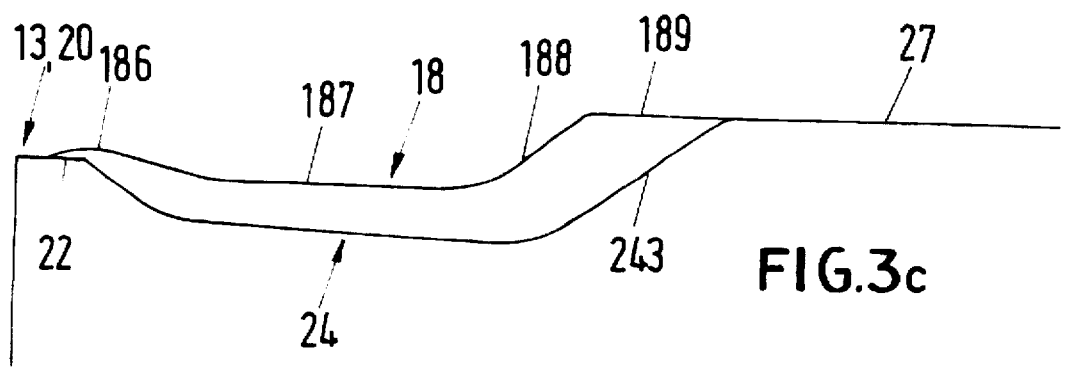
FIG. 3c

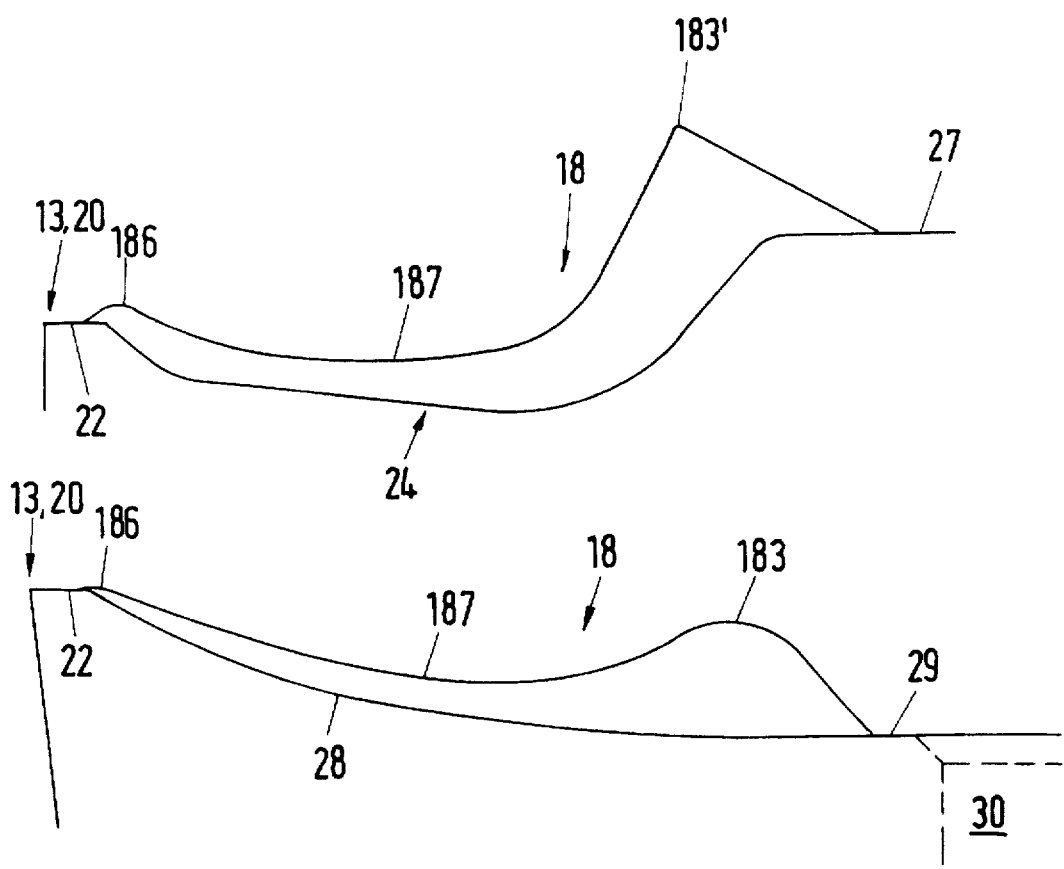

FIG.3f
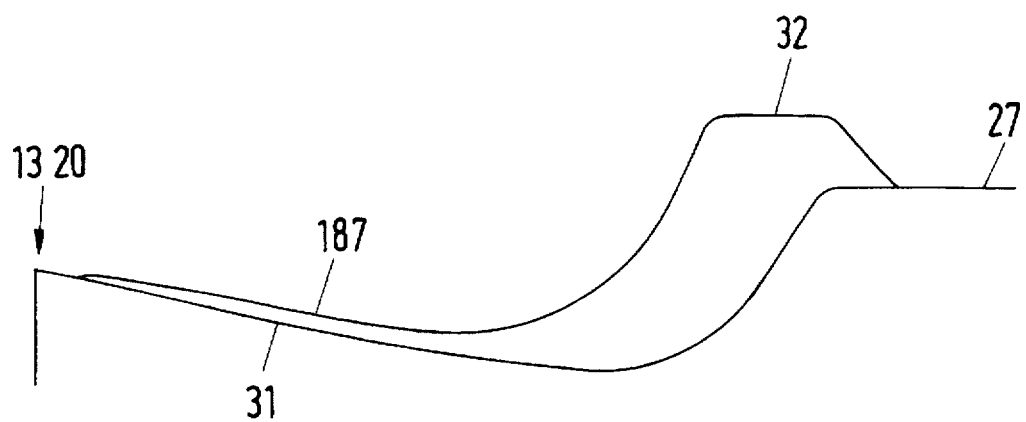
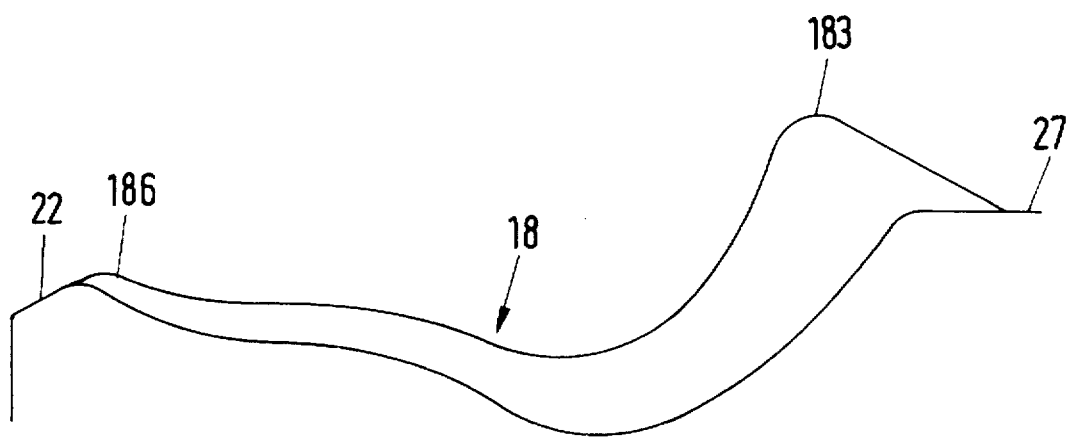
FIG.3g

FIG.3h
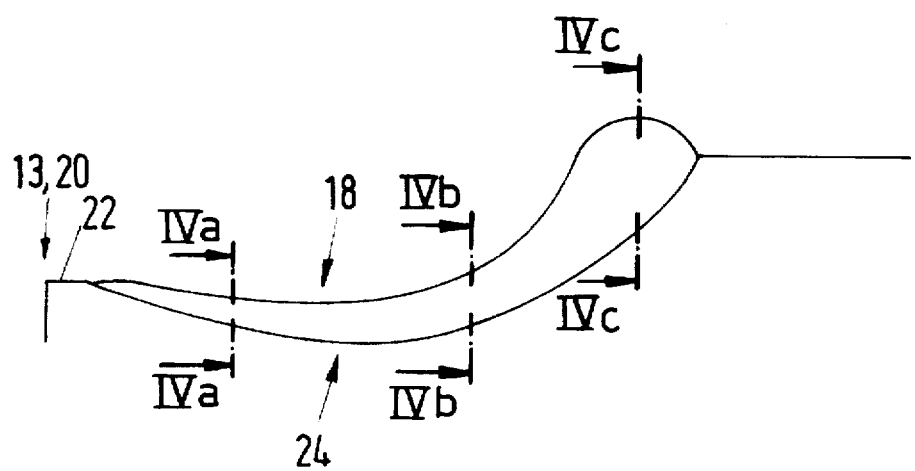
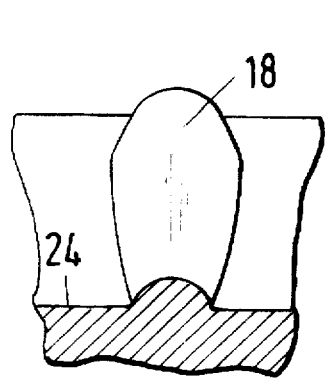
FIG.4a
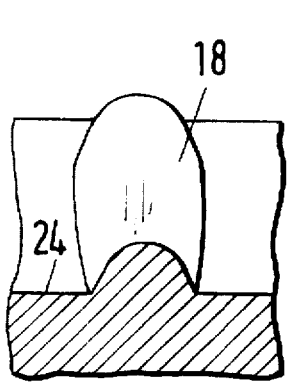
FIG.4b
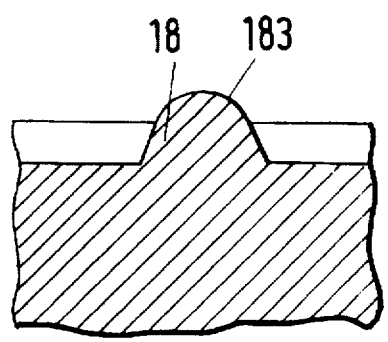
FIG.4c

CUTTING INSERT

CROSS REFERENCE TO RELATED APPLICATIONS

This application is the U.S. national phase of PCT application PCT/DE93/01108 filed 18 Nov. 1993 with a claim to the priority of German application P 42 39 236.5 itself filed 21 Nov. 1992.

FIELD OF THE INVENTION

The invention relates to a polygonal cutting insert with on the cutting surface raised chip-forming elements that are arranged in a row next to one another at a spacing from the cutting edge and which are each elongated with a respective longitudinal axis which forms an acute angle with a perpendicular to the cutting edge.

BACKGROUND OF THE INVENTION

Such a cutting insert is known from U.S. Pat. No. 4,969,779.

A cutting tool is known from German 2,231,631 having a chip-breaking groove in which at least one frustoconical projection is provided in a cutting corner.

It has also already been suggested to arrange a plurality of part-spherical chip-forming elements next to one another in a chip-breaking groove.

The known cutting inserts are nonetheless, due to the arrangement of the chip-forming elements and the geometry of the chip groove, only usable in a limited range of different cutting conditions, as with various cut depths and feed rates. In order to improve the usability of the cutting inserts and to better shape and remove the chip German 3,148,535 suggests forming the chip-forming elements generally frustoconically with generally triangular base surfaces, each having a base line aligned parallel with the adjacent cutting edge or on an arcuate line.

According to German 2,819,824 a cutting insert is suggested having in its center a boss (plateau) which is formed as a polygon and whose basic shape corresponds to that of the cutting insert. In particular the corner of the rectangularly shaped boss is aligned to the center of the cutter but is otherwise formed annularly. Such cutting inserts are also known where the chip-forming boss extends right up to the cutting corner region. The disadvantage of such embodiments is that during cutting high pressure is produced which can lead to premature wear of the cutting insert. In addition the achieved cut quality is unsatisfactory.

In order to ensure uniformly good chip formation at widely different feed rates, cut depths, and cutting speeds it has been suggested in European 0,278,083 to provide a cutting angle of more than 30° on the land adjacent the cutting edge, the cutting angle decreasing away from the land, and chip ribs projecting outside the cutting surface are provided in the cutting surface region extending in the chip-travel direction and between the cutting-corner regions of the cutting insert, between which chip ribs further bumps with run-on ramps are provided. The corner region has three adjacent spur bosses of which the two outer ones have their chip longitudinal axes parallel to the adjacent chip ribs.

Run-on ramps are also provided in the (plunge) cutting insert according to U.S. Pat. No. 4,992,008, these ramps being directly at the cutting corners and extending as a wide roof surface in the direction away from the cutting edge of an elongated chip-forming element with a trapezoidal shape.

The cutting inserts described in European 0,168,555 and 0,222,317 have a central plateau that is raised relative to the cutting corners and cutting edges and from which part-spherical projections extend toward the cutting edge and extend if necessary into a chip-forming groove provided there.

European 0,414,241 describes cutting inserts with pits which interrupt the cutting edge and thus form groove-like cutting-edge formations. This arrangement nonetheless has a wearprone cutting edge that is likely to chip.

Part spherical chip-forming elements do indeed lead during chip formation to a desired chip formation but the chip is neither laterally sufficiently guided in the chip-travel direction so that lateral breaking of the chip can lead to over deformation of the chip and no actual chip breaking or insufficient chip breaking. Longitudinally elongated chip-forming element guide the chips better in the travel direction but if the contact surface on the rib is to small the chip easily can break off to the side. The mentioned chip run-on ramps are difficult to make and subject to wear.

OBJECTS OF THE INVENTION

Starting from this state of the art the object of the present invention is to improve the above-discussed cutting inserts with respect to the formation of the chip-forming elements so that with a relatively large starting curve of the chip, in particular when the chip former is used with a small feed rate, there is a particularly large bending of the chip. A further object is that the cutting insert should be usable in the widest possible feed region so that with greater advance an excessively small starting curvature or too tight a rolling of the chip is avoided.

SUMMARY OF THE INVENTION

A cutting insert for material-removing machining is formed with at least one generally straight cutting edge and a central flat plateau spaced backward from and at a predetermined height above the cutting edge. A plurality of elongated ridge-like chip-forming elements each extended along a respective longitudinal axis forming a respective acute angle to a respective perpendicular to the cutting edge from a leading end spaced backward from the cutting edge to a trailing end at the plateau and are each formed of a row of discrete bumps defining a contour line having adjacent the rear end a rear portion of a maximum height at least equal to that of the plateau, forward therefrom a front portion of a minimum height normally therebetween a rising intermediate portion having a length equal to at least half a length of the respective element. The cutting insert further is formed with a land extending along the cutting edge between the front ends and the cutting edge and a groove extending parallel to the cutting edge between the land and the plateau, the chip-forming elements being mainly in the groove.

The invention is based on the following considerations:

Chip-breaking is based on deforming the cross section of the passing chip until it breaks. Chip-breaking can be influenced both by the chip cross section and by the starting bend arc which is imparted to the chip by the chip-forming element of the cutting insert. It is indeed known that chip breaking is enhanced by increasing the thickness of the chip, however the chip thickness is largely determined by the material being machined and other machining conditions.

Producing the smallest possible starting bend radius to improve chip breaking has generally the disadvantage of greater cutting forces and the associated increased load on the cutting insert. This is added to dynamic forces that can lead to impermissible vibrations in the cutting process both with respect to frequency and amplitude. This is particularly critical under unstable machining conditions, as for example for thin work-pieces, when plunging, with inside machining, and with drilling. In extreme cases the chips can jam up in the chip former and break the tool.

On the other hand the starting curvature radius can also not be selected at any large size since the chip must be bent further in order to break. Accordingly there are generally longer and "opener" chips, chip curls, and chip pieces. In this manner the danger grows that the chip is insufficiently deformed by the chip former and, as a result of the effect of the forces and moments which are associated with the chip-breaking process as well as because of its size, it is in the position to deviate from the obstruction formed by the chip-forming element. This can lead to undesired helical chips. The longitudinal ribs according to the invention deform the chip cross section in grooves near the blade where the chip is easily plastically deformed. The spacing of the ribs from the cutting edge is maintained at a minimum to reduce the effects of friction so that the danger of breakage at the cutting edge is kept small. The longitudinal ribs provide due to their formation, in particular their length, better chip guiding which counters lateral deflection of the chip. As a result the chip can be bent to a large radius for breaking. The high point in the region spaced from the cutting edge or the inclination of the raised longitudinally extending chip-forming element up to the height of the central cutting-surface plateau ensure that even with greatly bent chips lateral guiding is not reduced or lost. In particular the contact of the passing chip and thus the friction on the chip-running surface is reduced to a minimum so that greater service life for the cutting inserts is achieved. The formation of the cutting surface by producing intermediate spaces between the ribs ensures exceptional accessibility for coolant which also helps to increase the life (service life) of the cutting insert. Finally the ribs have a stabilizing effect on the cutting edge.

Further features of the invention serve to produce an exponential position of the rib high points along with a convex curvature of the rib profile to the summit point so that additional space is created in order to over stretch the chip and bend it around. The described curvatures are increased by the groove formation when the chip as result of engagement against an obstruction is pressed against the cutting insert.

With higher feed rates the ribs minimize the danger of the chips jamming up, and of vibrations since as a result of the thinness of the rib the chip can be formed are "rolled open." Particular advantages are possessed by the cutting-insert geometry which is used by drills into which the cutting insert is set since according to overlap and drill diameter the chip or chips produced from the two cutters are generally centrally guided or laterally guided and deflected and rolled up conically.

In particular so-called short-hole drills use W-type cutting inserts which are of triangular shape with the cutting edges having a roof-shaped projection forming an obtuse angle.

In order to use such cutting inserts both for right- and left-handed turning and inside and outside cutters the chip-forming elements are formed and arranged symmetrically with respect to a longitudinal axis that extends as a bisector through a cutting corner and through the center of the opposite cutting edge, namely at its obtuse-angle corner.

In particular with indexable cutting plates with a bore seat and above all with positive indexable cutting plates with conical bit holes there is limited space available on the cutting surface. In order to accommodate these relationships the high point of the rib crest remote from the cutting edge or its height above the cutting-surface plateau decreases uniformly or in steps from the sharp (cutting) corners to the obtuse corners or the center of the cutting edge. A corresponding uniform or step-wise decrease is also provided with respect to the distances, that is the height differences, between the rib crest and the base surface in the same described region. It is also possible to provide for uniformly or step-wise decreasing spaces of the rib points to the cutting edge from the (acute) cutting corners to the obtuse-angle corners. The goal of the described features is to achieve sufficient stability and protection against a dip collar at the narrowest place with uniform chip bending over the width of the chip.

Alternatively it is also possible to form the central rib between a cutting corner and the middle of the cutting edge somewhat higher than the adjacent ribs in order to there achieve a greater deformation of the chip cross section.

BRIEF DESCRIPTION OF THE DRAWINGS

Embodiments of the invention are illustrated in the drawings. There is shown in:

FIGS. 3a to 3h longitudinal sections along a chip-forming element;

FIGS. 4a to 4c cross sections taken along lines IVa—IVa, IVb—IVb and IVc—IVc of FIG. 3h;

FIG. 5b is an end view showing the outlines of the three sections shown at Vb1—Vb1, Vb2—Vb2, and Vb3—Vb3 of FIG. 5a;

FIG. 6b a top view of the chip-forming elements according to FIG. 6a and

SPECIFICATION DESCRIPTION

Figure 1:
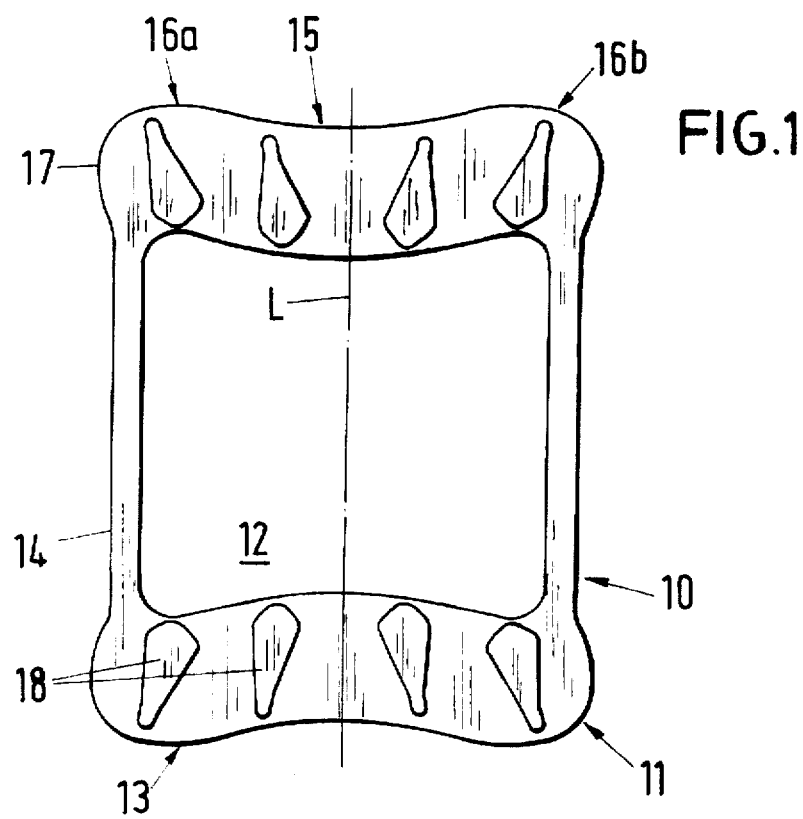
FIG. 1 a top view of a generally rectangular cutting plate with two cutting edges and four respective chip-forming elements per cutting edge.

The cutting insert 10 shown in FIG. 1 has a generally rectangular shape with four cutting corners 11 which define the cutting surface 12 as well as the cutting edges 13 and the longitudinal side edges 14. As known in the art the cutting insert can have a mounting hole (not shown) Each of the two opposite cutting edges 13 has a central setback 15 as well as symmetrically to both sides thereof two rounded projecting regions 16a and 16b. Inward from each corner 11 the cutting insert 10 has extensions 17 which are generally parallel to the longitudinal axis L. These extensions 17 serve during use when the cutting insert is set in a drill bit as auxiliary cutting edges. The auxiliary cutting edges each have a length which should correspond to the feed per revolution of the bit. It is somewhat in the range up to 4/10 mm. To bridge between the auxiliary cutting edges 17 and the long side surfaces 14 there is a bevel which runs at an angle up to 25°. The cutting insert has raised chip-forming elements formed as elongated ribs whose longitudinal axes are directed so that they run in the direction of chip travel. In the case of a rectangular cutting insert according to FIG. 1 this is concrete in that the angle of the longitudinal axes of the chip-forming elements 18 are smaller inward on the setback 15.

Figure 2:
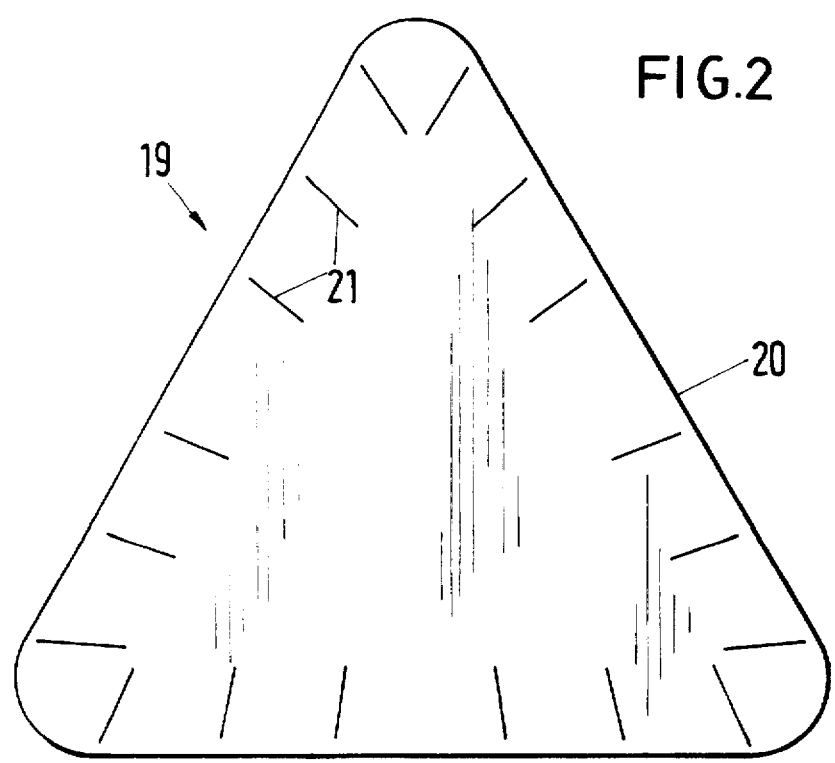
FIG. 2 a triangular cutting plate with six chip-forming elements per cutting edge.

FIG. 2 shows a generally triangular cutting insert 19 which has three cutting edges 20. The rib-shaped chip-forming elements whose axes 21 alone are shown also run generally in the chip-travel direction so that the angle of the longitudinal axes 21 with a central perpendicular of a cutting edge are smaller toward the center of the cutting edge. The cutting inserts shown in FIGS. 1 and 2 are only by way of example, basically all known polygonal shapes as well as indexable plates with part-circular blades can be equipped with the illustrated rib-shaped chip-forming elements. The ribs 18 can have a uniform width along their entire longitudinal axis or can widen toward the region remote from the cutting edge as shown in FIG. 1.

The different shape possibilities of the longitudinal profile are shown in FIG. 3.

As can be seen in FIG. 3a behind the cutting edge 13 or 20 a land 22 is first defined, here at an angle of 0°.

After the land is a chip-forming groove 24 with a descending flank part 241, a flatly descending part 242, and a rising flank 243 up to a plateau 23 in the middle of the cutting surface. The entire chip-forming groove 24 extends past the chip-forming element 18 that runs at its end toward the cutting edge at the height of the land 22 and in the middle has a descending region 181, then a slightly rising region 182, and finally a convexly curved region 183 with this convex curvature reaching a high point that is above the plane defined by the plateau 23. The chip-forming element runs into the plateau "behind" the chip-forming groove 24. In contrast to the embodiment according to FIG. 3a the embodiment according to FIG. 3b follows the land 22 with a chip-forming groove 25 behind which is a further groove-shaped recess 26 that forms a slight recess whose biggest region forms a climbing flank to a raised plateau 27 that projects clearly above the cutting edge or the adjacent land 22. The chip-forming element runs past the descending part of the first chip-forming recess 25, that is into the land 22. This chip-forming element has a slightly wavy rib-comb shape with a first low point 184 as well as a slightly convex bump 185 in the rising region to a high point 183. The chip-forming rib ends in the region of the plateau 27 somewhat behind the edge of the climbing flank 261.

The chip-forming recess of the embodiment according to FIG. 3c corresponds generally to the chip-forming recess of FIG. 3a so reference to this embodiment is made. The same applies to the land 22 and the plateau 27 (see description of FIG. 3b). The chip-forming element 18 runs generally centrally into the land 22 at the cutting edge 13 or 20 and continues in the direction of its longitudinal axis beyond a high point 186 as a concave region whose central zone 187 runs parallel to the plateau surface 27 or the land 22 but below same. Following this horizontally oriented zone 187 the chip-forming element 18 has a climbing flank 188 that rises to a height corresponding to the plane of the plateau 27. Outward from this point the chip-forming element goes into a horizontal part 189 and ends at the edge of the plateau 27 at a climbing flank 243 of the recess 24. The chip-forming element according to FIG. 3d has relative to the rib comb according to FIG. 3c a more highly defined high point 186 as well as a central region 187 which is lightly concave with a large radius of curvature. The high point 183' is virtually pointed so that the rising and falling flanks of this high point are nearly straight seen longitudinally.

In the embodiment of FIG. 3e the land 22 merges into a descending convexly curved chip-forming part 28 with a recessed middle part 29 in which a bore 30 is also shown. The chip-forming element 18 merges via a flatly extending high point 186 into a convex region 187 as well as a high point 183 that itself lies below the plane defined by the land 22. The chip-forming element 18 ends in the region of the recessed central part 29.

In the embodiment according to FIG. 3f the cutting edge 13 or 20 has a positive land or is followed by a descending region 31 of a chip-forming groove. The chip-forming rib starting at a spacing from the cutting edge 13 or 20 has a crest which to start with drops slightly, runs through a valley region, and ends in a steep climbing flank to a saddle-shaped plateau 32 before the descending flank drops to the central plateau 27 of the cutting insert.

Figure 5A:
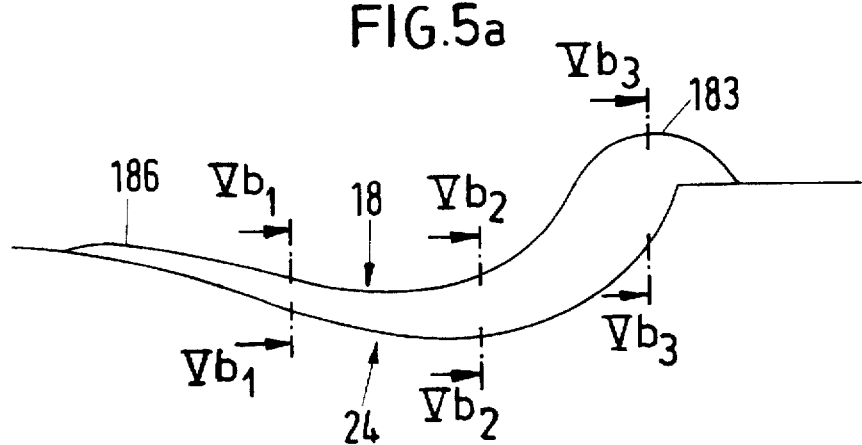
FIG. 5a a longitudinal section through a chip-forming element.

The cutting insert according to FIG. 3g has a negative land with a rising angle at which the chip-forming rib rises to a first high point 186. The chip-forming rib drops steadily from this high point 186 with its crest alternately convex and concave to a high point 183. The falling flank from the high point 183 to the central plateau 27 is straight. The embodiment of FIG. 3h has a chip rib which ends in the falling part of the chip-forming recess 24 and has different cross-sectional shapes running to the regions remote from the cutting edge as visible in the sections taken along lines A, B, and C of FIGS. 4a to 4c. A further feature of the chip-forming rib 18 of the chip-forming rib crest or the upper part or saddle is seen in FIG. 5a. Comparing the spacing of the crest of the chip-forming rib to the chip-forming region at various spacings from the cutting edge 13 or 20 it can be determined that these spacings grow continuously away from the cutting edge.

Figure 5B:
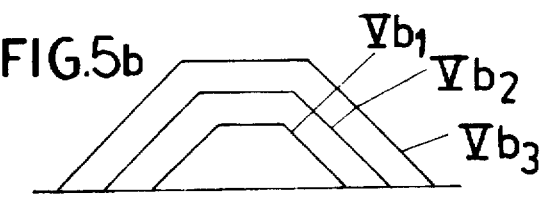
Figure 5G:
Figure 5C:
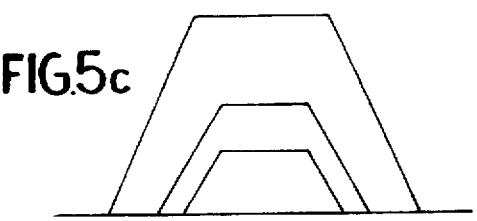
FIGS. 5c through 5p are views analogous to FIG. 5b but showing different configurations.
Figure 5H:
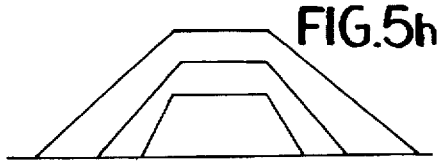
Figure 5D:
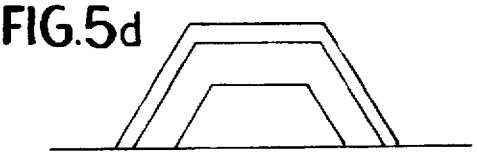
Figure 5I:
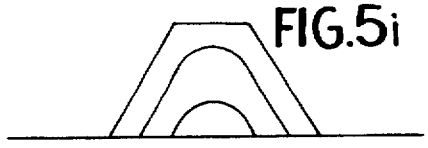
Figure 5E:
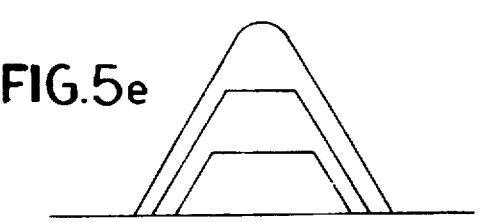
Figure 5K:
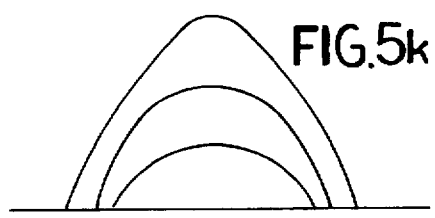
Figure 5F:
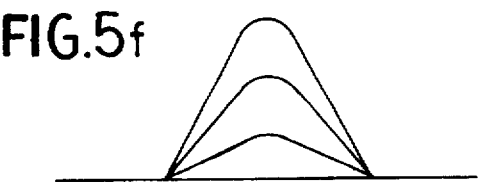
Figure 5M:
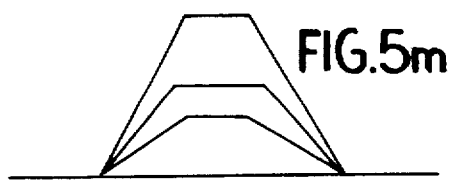
Figure 5N:
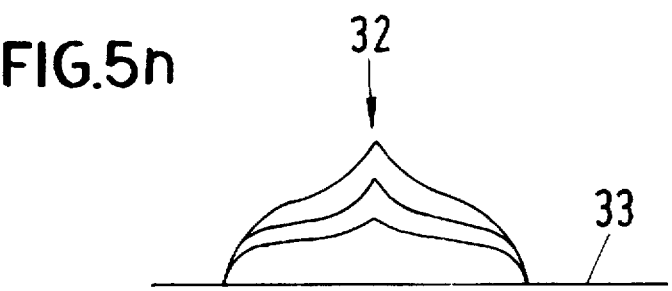
Figure 5O:
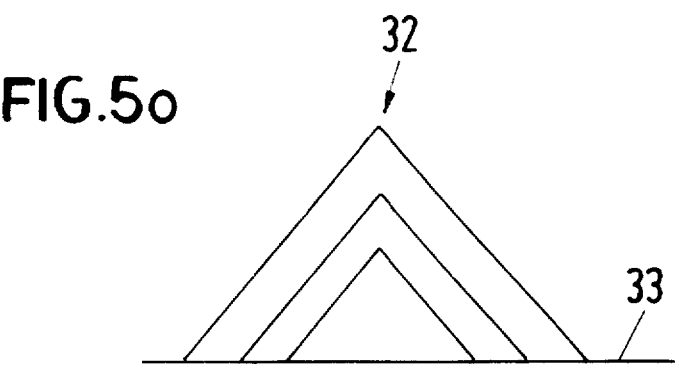
Figure 5P:
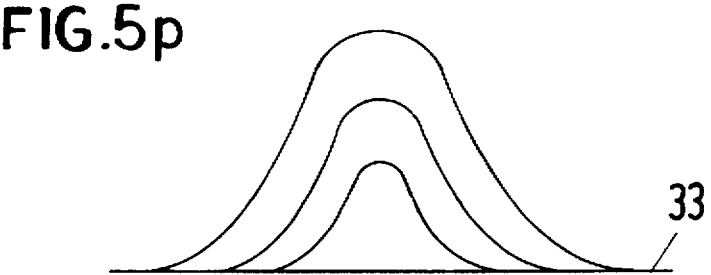

FIGS. 5b to 5p show various sectional views along lines I—I, II—II, and III—III generally parallel to the cutting edge. In order to make the changes in section between the sections clearer the respective bases of the sections are set straight and one over the other although for example the chip-forming groove in section II—II is deeper than in section I—I.

FIGS. 5b to 5p show that all sections have the same shape and it can also be seen how the cross-sectional area grows with respect to height and width away from the cutting edge. Specifically the chip-forming rib can have a trapezoidal cross section (FIGS. 5b to 5d or 5h). The cross sections are different in the base width, the base being the surface in the region of the cutting surface as well as the width of the flatly formed rib crest. Similarly the flanks falling from both sides of the crest can be different. As visible from FIG. 5e the crest can be changed from an upper flat surface at the high point 183 to a round shape or as shown in FIGS. 5f and 5g as well as 5k in a convex shape. In contrast according to FIG. 5i the chip-forming crest can be flat in the rear end remote from the cutting edge and rounded in the front regions. FIG. 5m shows that different angles are possible between the individual section planes. The chip-forming rib 18 according to FIGS. 5n and 5o have an upper point 32 from which the lateral flanks are either wholly flat (FIG. 5o) or convex to start with and then concave to the surface 33 which if necessary can be formed as a groove. As visible from FIG. 5p the side flanks 33 can have a convexity which is tangential at the base.

For all shapes according to FIGS. 5b to 5p of course such contour shapes can be employed as shown in FIGS. 3a to 3h and described above.

Figure 6A:
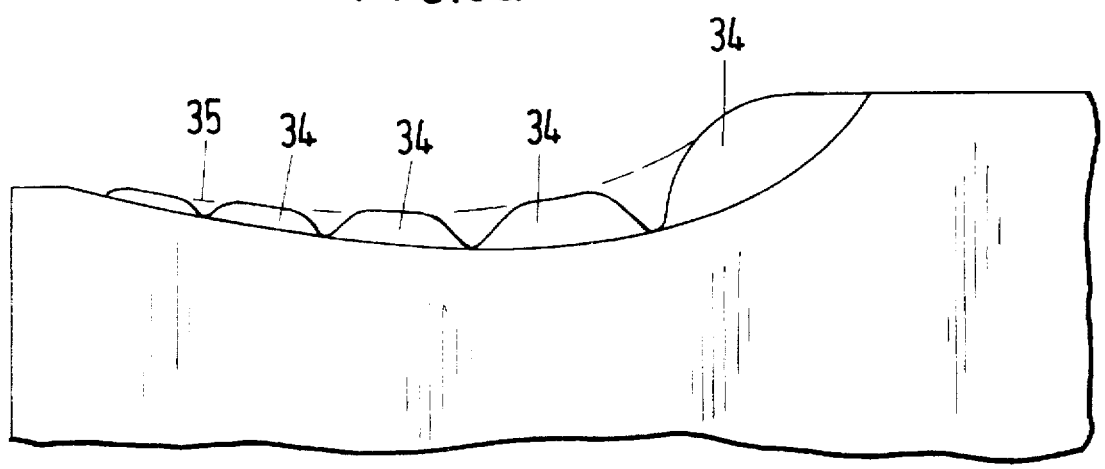
FIG. 6a a longitudinal section through another embodiment of the chip-forming elements.
Figure 6B:
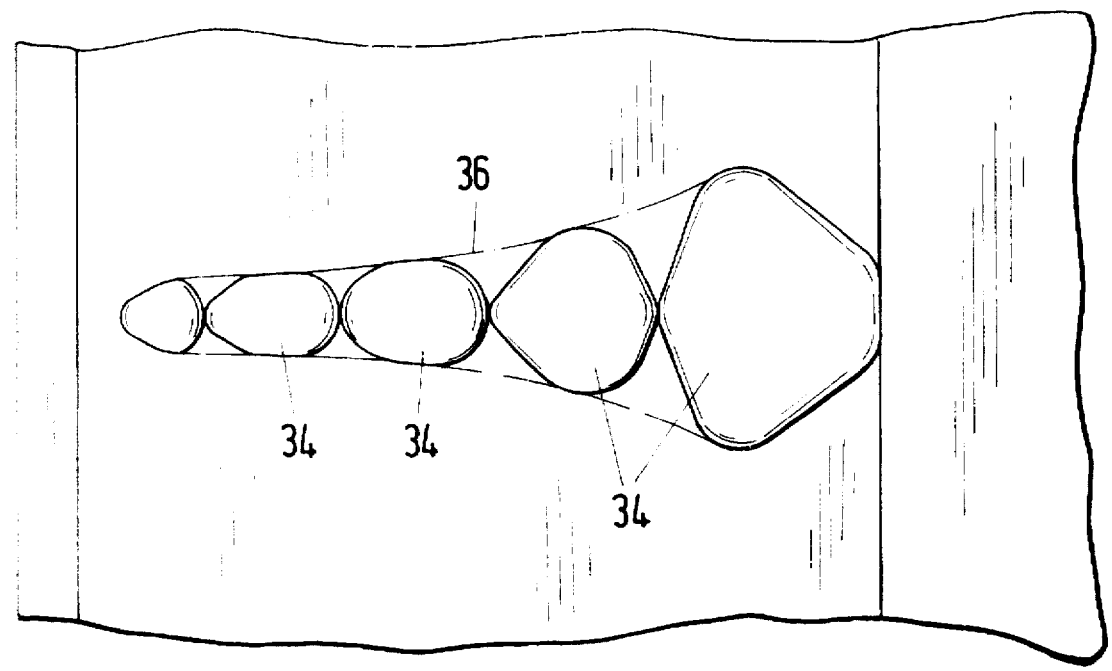

According to a further embodiment of the invention the ribs can be formed of a plurality of succeeding and touching or spaced bumps 34 having contour line 35 or 36. The same is possible for the above-described ribs (see FIGS. 6a and 6b).

Figure 7A:
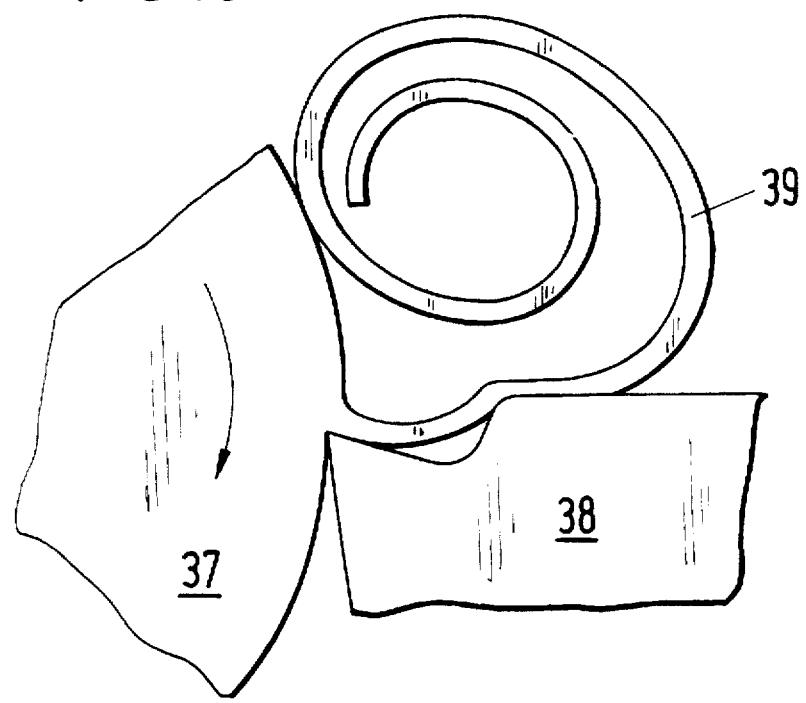
FIGS. 7a and 7b similar views showing chip travel with a cutting insert according to the invention (FIG. 7b) and with a cutting insert according the prior art (FIG. 7a)
Figure 7B:
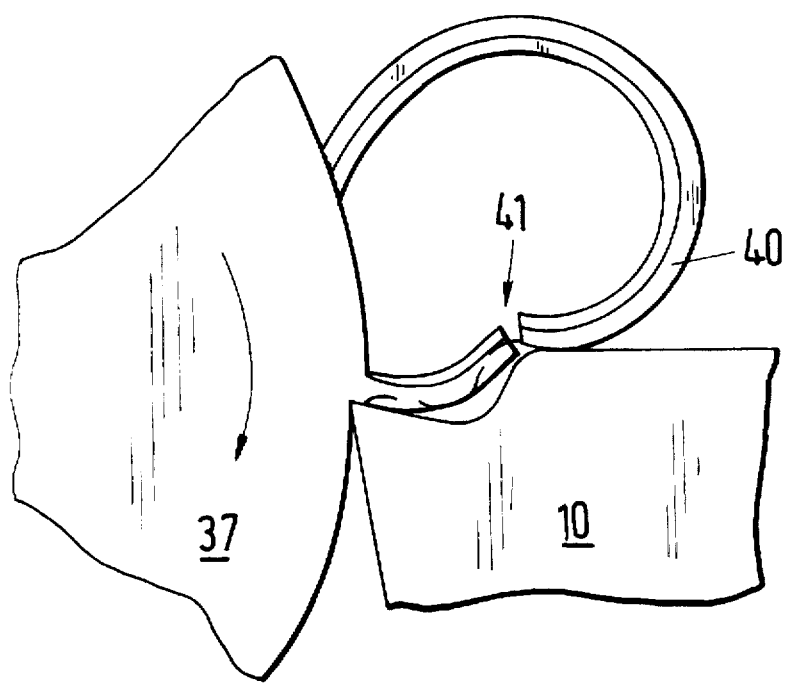

The operation of the cutting insert according to the invention is visible from FIG. 7 which in the representation of FIG. 7a shows the passing chip with a cutting insert known from the prior art and in FIG. 7b shows a cutting insert according to the invention. On rotation of the workpiece 37 a conventional cutting insert 38 produces a long chip 39 which in spite of the chip-forming groove and chip-guiding step leading to a plateau of the cutting insert does not break so that long coiled chips are produced. The chip 40 produced by the cutting insert according to the invention works otherwise because of its excess deformation and/or its better lateral guiding so that after engagement with the workpiece 37 a break (see arrow 41) occurs for the desired short chip formation.

Figure 8A:
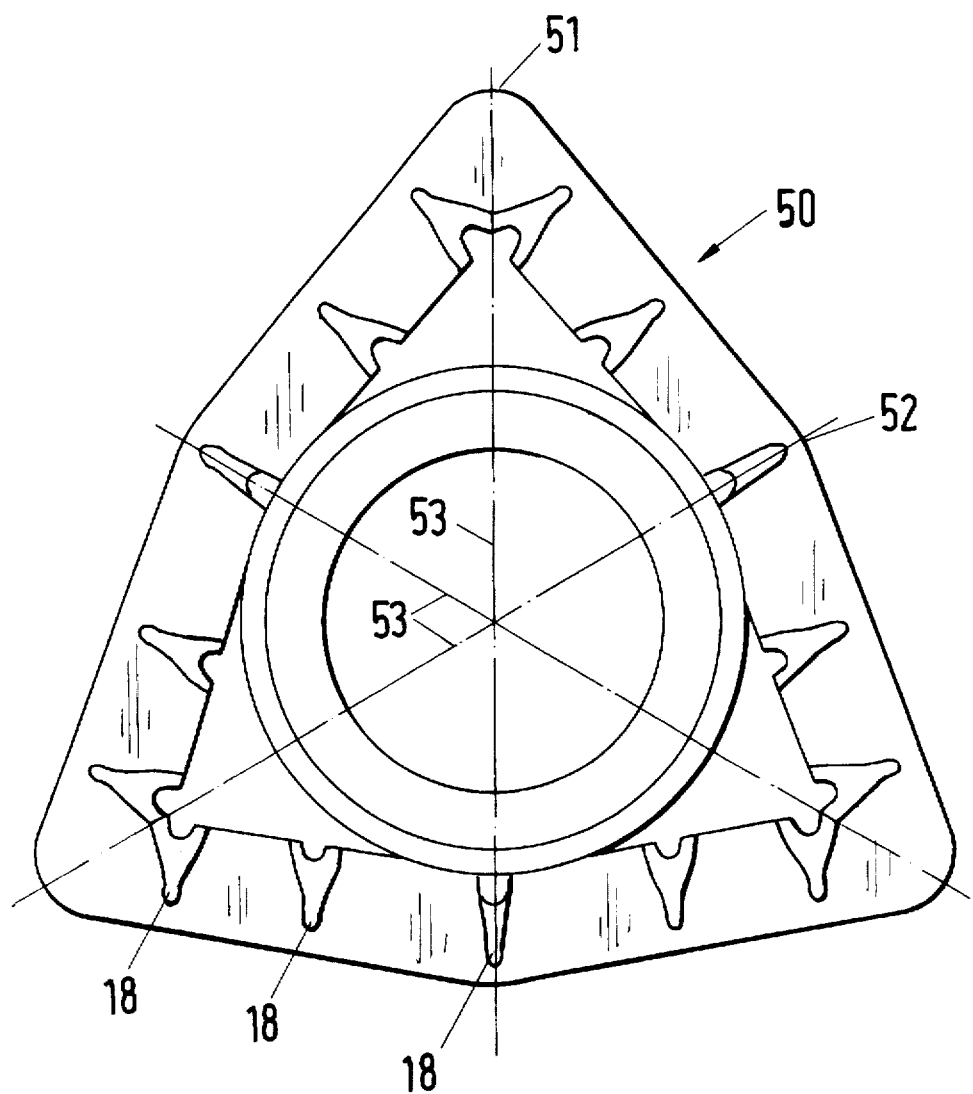
FIG. 8a a top view of a further embodiment of a cutting insert.

The cutting insert shown in FIG. 8a has a triangular shape with three (pointed) cutting corners 51 and three blunt cutting edges 52 that form an angle of about 160 ° and that are located centrally between two cutting corners 51. If a longitudinal axis 53 is drawn through a pointed cutting corner 51 and the opposite obtuse cutting corner 52, the chip-forming elements 18 are arranged mirror-symmetrical to the respective longitudinal axis 53. This includes as shown in a FIG. 8a such embodiments where a longitudinal axis 53 is also the longitudinal axis of a chip-forming element 18 or lies on the longitudinal axis 53.

This way the cutting insert can be used in right- and left-hand turning tools as inside and outside cutters. The orientation of the chip-forming element satisfies the requirements that the inner ribs are tipped relative to the central axis by an angle from −5° to 13° and the outer ribs by an angle of −5° to 200°.

Figure 8B:
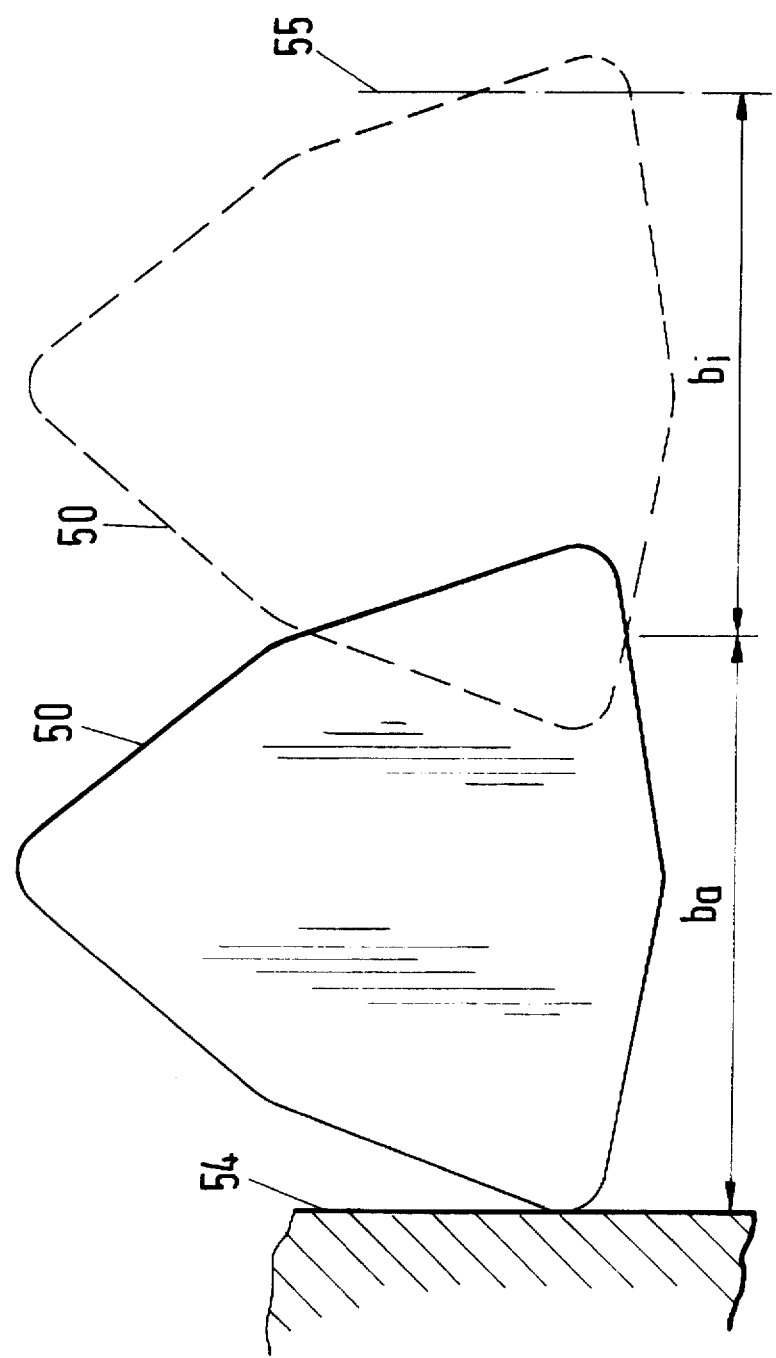
FIG. 8b a schematic top view of the cutting insert according to FIG. 8a fitted to a drill bit during cutting in a bore hole.
Figure 9A:
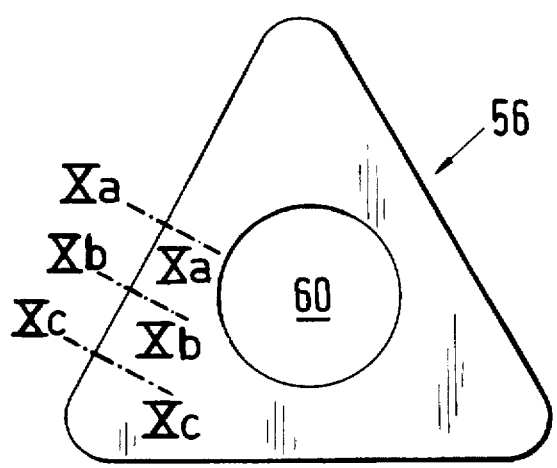
FIGS. 9a to 9d various cutting inserts in top view.
Figure 9B:
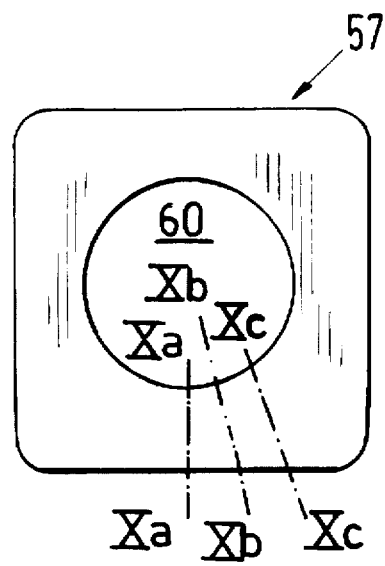
Figure 9C:
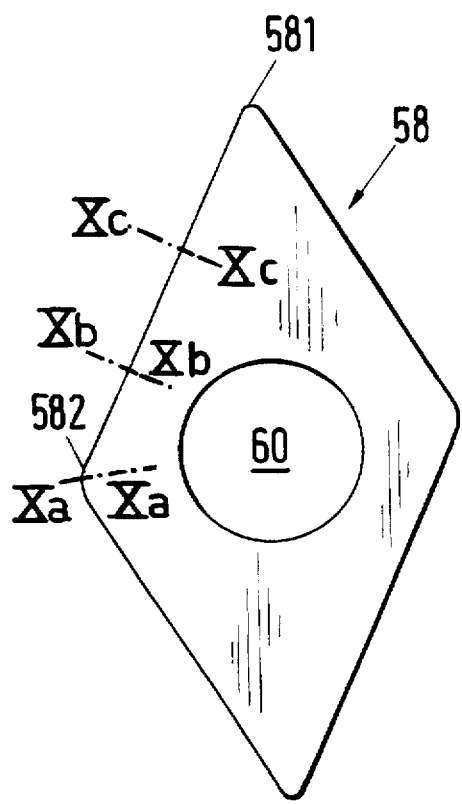
Figure 9D:
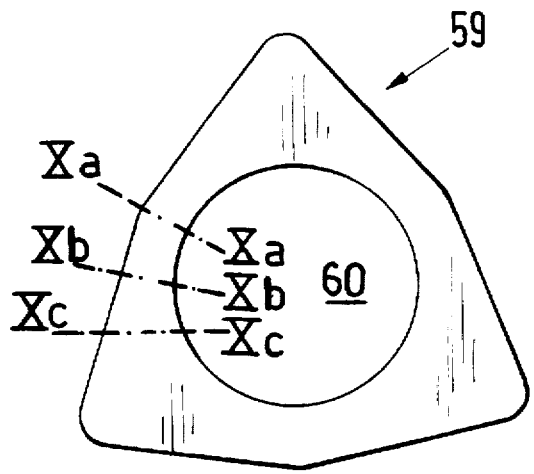

FIG. 8b shows cutting inserts according to FIG. 8a in use in drill. Within a bore wall the outer cutting insert cuts with a cutting width $b_a$ and the inner cutting insert with a cutting width $b_i$. The bore axis is shown at 55.

FIGS. 9a to 9d show different cutting inserts 56 to 59 with a mounting hole 60.

Figure 10C:
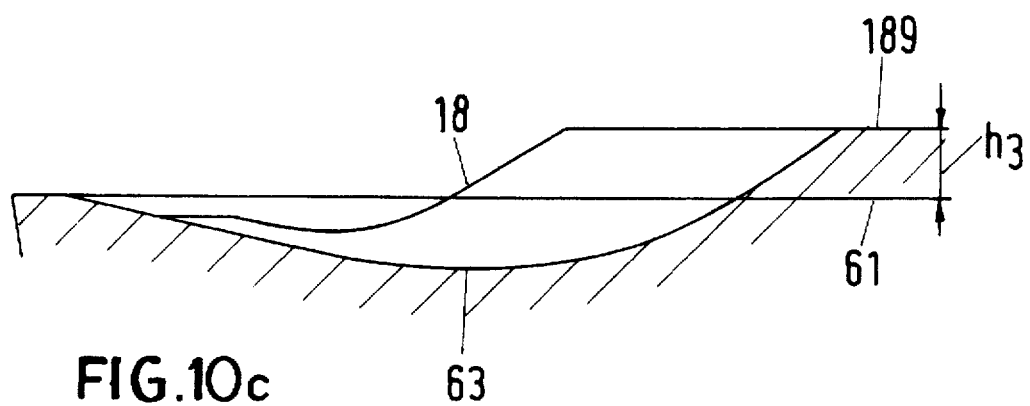
FIGS. 10a through 10c sections along sections lines Xa—Xa, Xb—Xb, and Xc—Xc of FIG. 9a through 9d and FIG. 11a through 11c corresponding sections through a further embodiment and FIG. 12 a top view of an exclusively left- or right-cutting plate.
Figure 10B:
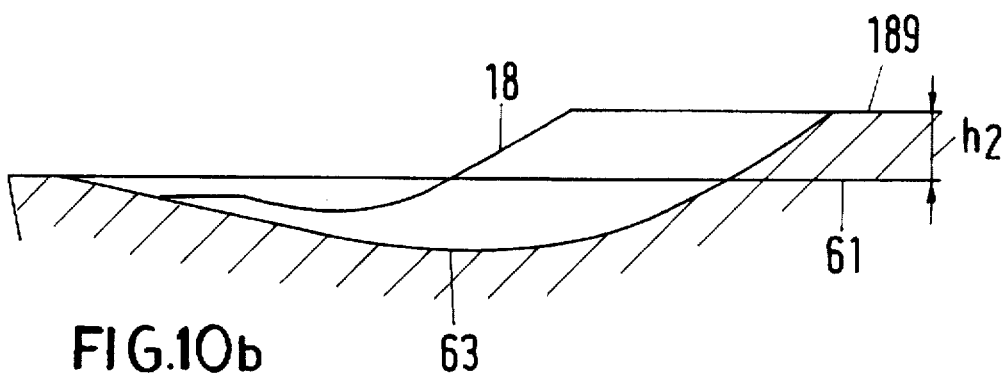
Figure 10A:
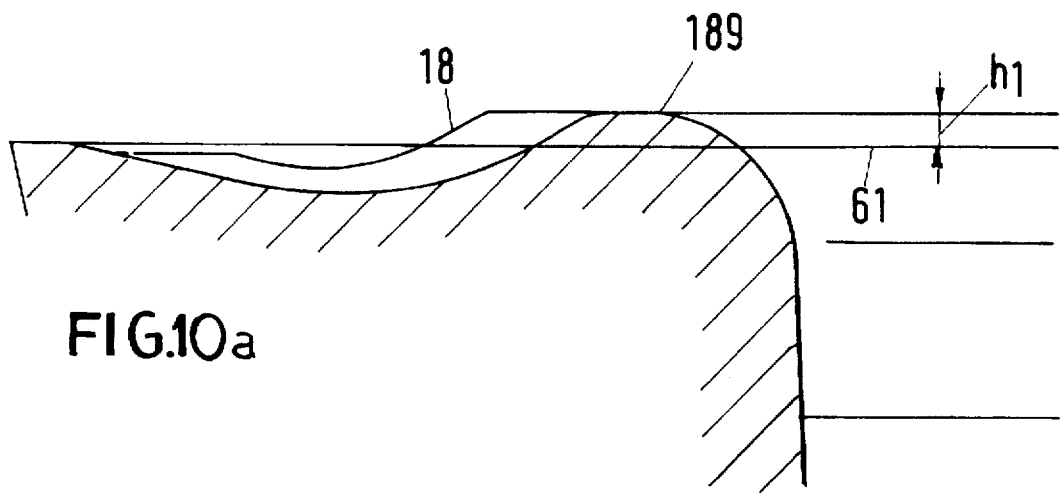
Figure 11A:
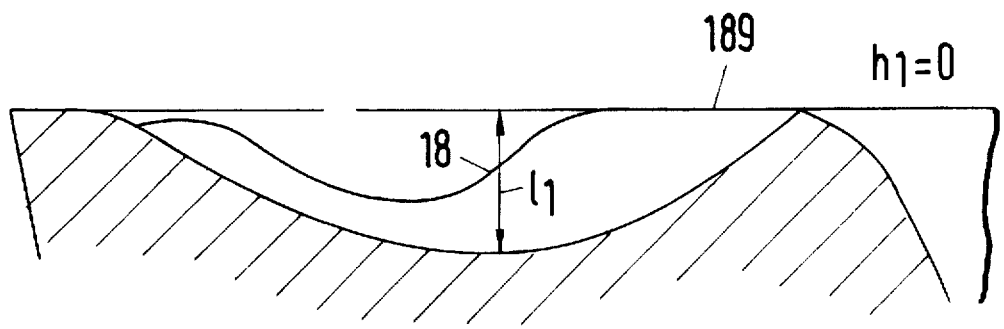
Figure 11B:
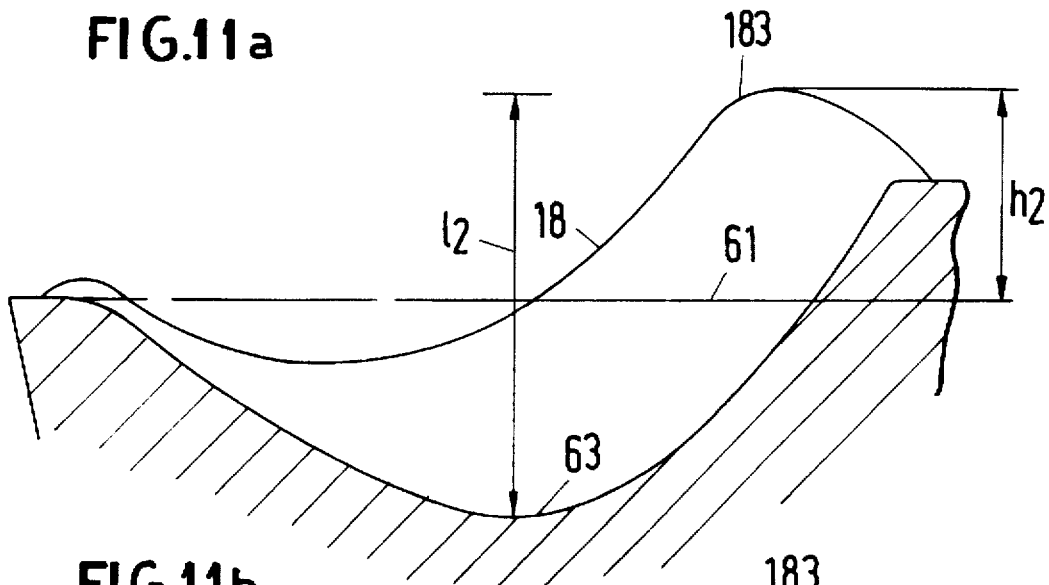
Figure 11C:
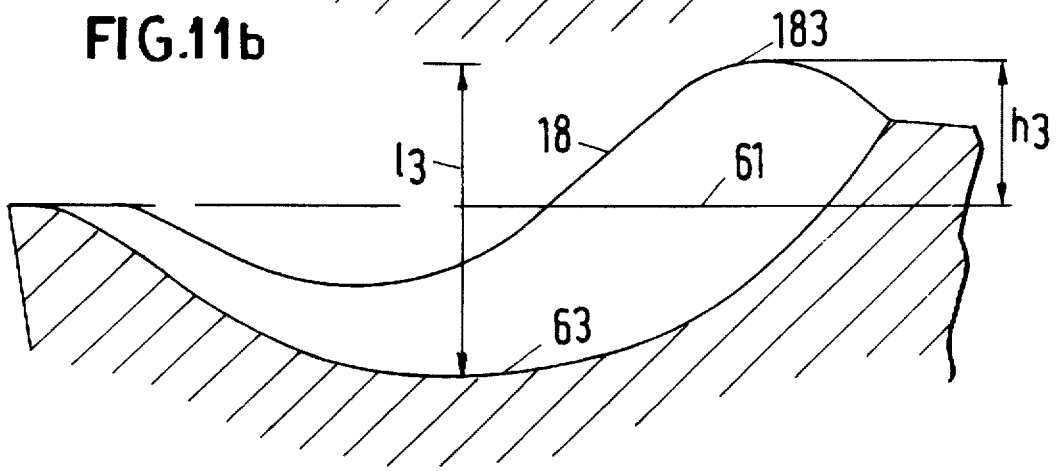

As visible individually with reference to the sections A—A, B—B, and C—C in FIGS. 10 and 11, different embodiments are usable. In particular with rhombic or triangular indexable cutting plates, e.g. the standard D, K, V, W shapes, the high point remote from the cutting edge of the rib crest or its part 189 level with the cutting surface plateau lies at different spacings from the cutting edge seen from the sharp corner to the obtuse corner (section C—C to section A—A), that is the heights $h_3$ increase continuously above $h_2$ and $h_1$. In this manner the cutting inserts have sufficient stability as well as protection against sinking into the bore 560 at the tightest part. The chip is bent smoothly over the cutting width.

The spacings (height differentials $1_1$ to $1_3$) between the crest of the rib arc and the base surface 63 can also decrease smoothly or in steps from the blunt or pointed corners to the middle of the cutting edge. Finally the spacing of the rib high points can decrease smoothly or in steps from the cutting edge to the sharp to the blunt corners.

A further possibility of varying the geometry of the ribs and/or of the base surface on a cutting insert is shown in FIG. 11 where the central rib acting on the span is particularly prominent according to section B—B, that is has a big height $H_2$. This height becomes greater than $h_3$ with $h_1=0$.

Figure 12:
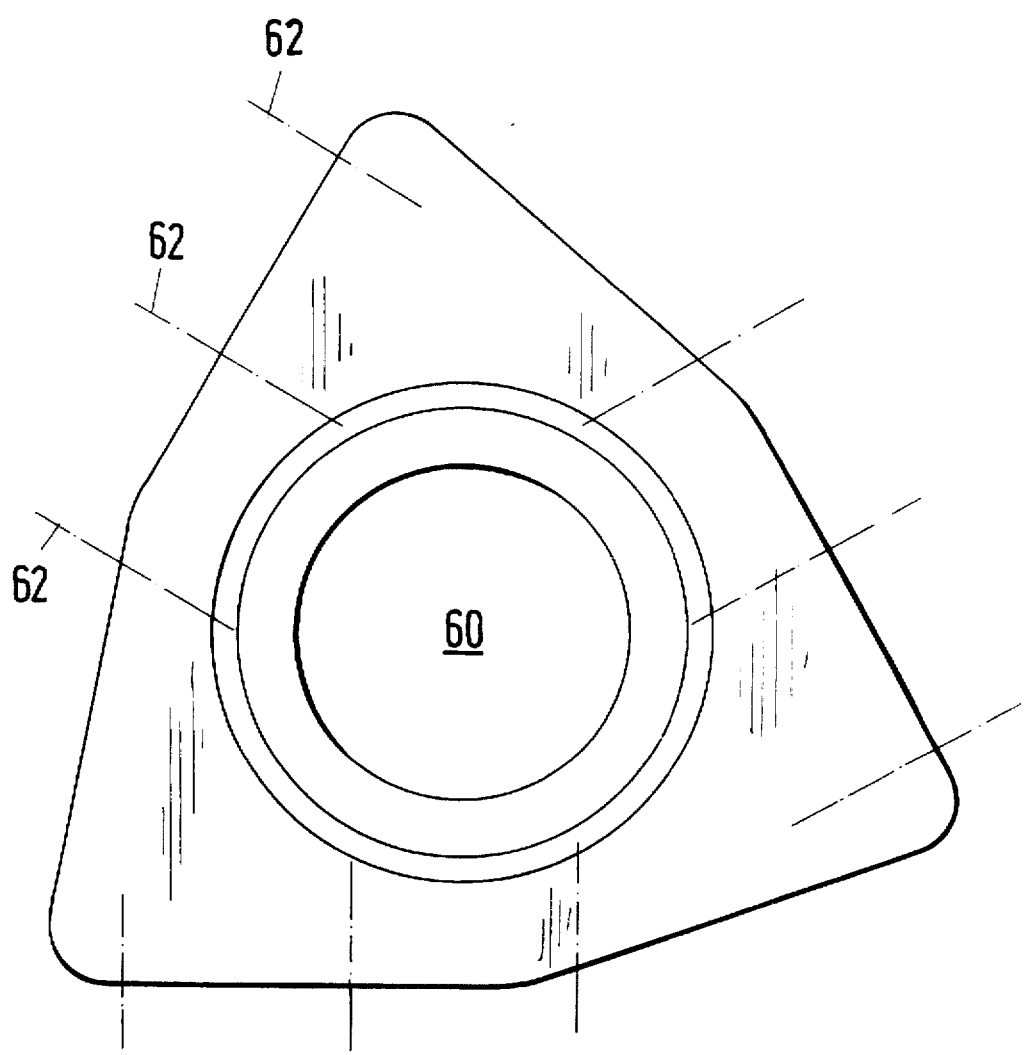

FIG. 12 shows by means of the illustrated rib longitudinal axes 62 a cutting insert for left- or right-handed machining.

We claim:

1. A cutting insert formed with:
   at least one generally straight cutting edge;
   a cutting surface extending to the edge;
   a central flat plateau spaced backward from and at a predetermined height relative to the cutting edge and to the cutting surface; and
   a plurality of continuous, elongated, ridge-like chip-forming ribs
   each surrounded by and projecting wholly above the cutting surface,
   each extending continuously along a respective longitudinal axis forming a respective acute angle to a respective perpendicular to the cutting edge from a leading end spaced backward from the cutting edge to a trailing end at the plateau,
   each having a continuous crest defining a contour line having adjacent the respective rear end a rear portion of a maximum height above the cutting surface at least equal to that of the plateau, forward therefrom a front portion of a minimum height above the cutting surface, and a rising intermediate portion above the cutting surface and having a length equal to at least half a length of the respective rib.

2. The cutting insert defined in claim 1 wherein the insert is further formed with
   a land extending along the cutting edge between the leading ends and the cutting edge; and
   a groove extending parallel to the cutting edge between the land and the plateau, the chip-forming ribs being mainly in the groove.

3. The cutting insert defined in claim 1 wherein each rib has a rear portion having the maximum height and of a length equal to at most one-third of the length of the respective rib.

4. The cutting insert defined in claim 2 wherein each contour line defines a supplemental front high portion between the respective front portion and the respective intermediate portion and having a height greater than that of the cutting edge.

5. The cutting insert defined in claim 2 wherein the ribs have side surfaces extending at an angle of at most 80° to a plane of the insert.

6. The cutting insert defined in claim 2 wherein the length of the ribs is between 0.7 mm and 5 mm.

7. The cutting insert defined in claim 2 wherein each rib has a predetermined width between its ends, the length of each rib being 1.2 to 4 times its width.

8. The cutting insert defined in claim 7 wherein the width of each rib decreases toward the cutting edge.

9. The cutting insert defined in claim 8 wherein each width is at a maximum within a distance equal to one third of the respective length from the respective rear end.

10. The cutting insert defined in claim 2 wherein the ribs are of generally constant width.

11. The cutting insert defined in claim 2 wherein the rear portion is between 0.05 mm and 1.5 mm high.

12. The cutting insert defined in claim 2 wherein each rib has a predetermined width and is spaced from adjacent ribs by a distance equal to between 1.5 and 10 times the respective width.

13. The cutting insert defined in claim 2 wherein the insert is polygonal having a plurality of sides each constituting a respective cutting edge and each formed with a respective plurality of the ribs.

14. The cutting insert defined in claim 2 wherein the insert is rectangular and has two opposite sides each formed with a respective such cutting edge each having a respective plurality of the ribs.

15. The cutting insert defined in claim 14 wherein the insert has two flanking sides bridging the cutting edges and each forming with the respective cutting edges a pair of laterally projecting corner extensions.

16. The cutting insert defined in claim 14 wherein each cutting edge is symmetrical to a longitudinal axis and has four such ribs symmetrically flanking the axis with two inner ribs and two outer ribs, the former being spaced from the axis by a distance equal to 5% to 20% of the length of the respective cutting edge and the former by a distance equal to 35% to 45% of the respective cutting-edge length.

17. The cutting insert defined in claim 2 wherein the leading ends are spaced at between 0.05 mm and 0.7 mm from the cutting edge.

\* \* \* \* \*